United States Patent
Heydlauf et al.

(10) Patent No.: US 11,537,968 B2
(45) Date of Patent: Dec. 27, 2022

(54) PREDICTIVE INVENTORY CONTROL INCLUDING SCHEDULING AND PERFORMING BIO-FLUID TESTS OUT OF ORDER BASED ON REAGENT INVENTORY EXPIRATION

(71) Applicant: Siemens Healthcare Diagnostics Inc., Tarrytown, NY (US)

(72) Inventors: Michael Heydlauf, Cary, NC (US); Jeffrey Hoffman, Lebanon, NJ (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 20 days.

(21) Appl. No.: 16/955,259

(22) PCT Filed: Jan. 25, 2019

(86) PCT No.: PCT/US2019/015078
§ 371 (c)(1),
(2) Date: Jun. 18, 2020

(87) PCT Pub. No.: WO2019/156828
PCT Pub. Date: Aug. 15, 2019

(65) Prior Publication Data
US 2020/0394586 A1 Dec. 17, 2020

Related U.S. Application Data (60) Provisional application No. 62/626,947, filed on Feb. 6, 2018.

(51) Int. Cl.
*G06Q 10/06* (2012.01)
*G05B 19/042* (2006.01)
*G06Q 10/08* (2012.01)

(52) U.S. Cl.
CPC ... *G06Q 10/06316* (2013.01); *G05B 19/0425* (2013.01); *G06Q 10/0633* (2013.01); *G06Q 10/06311* (2013.01); *G06Q 10/087* (2013.01)

(58) Field of Classification Search
CPC combination set(s) only.
See application file for complete search history.

(56) References Cited

U.S. PATENT DOCUMENTS 5,154,314 A * 10/1992 Van Wormer ........ G06Q 10/087
141/20
5,641,006 A * 6/1997 Autrey ................ A47L 15/4418
137/101.19

(Continued)

FOREIGN PATENT DOCUMENTS

EP 1231471 8/2002

OTHER PUBLICATIONS

International Search Report for PCT/US2019/015078 dated Apr. 15, 2019.

*Primary Examiner* — Scott L Jarrett (57) ABSTRACT

Methods of and apparatus controlling change-out inventory of an automated analyzer apparatus. The inventory control methods include receiving change-out inventory status from automated analyzer apparatus at a server, receiving an estimate of the planned workload over a specific time period at the server, analyzing with a decisioning module of the server first data of the change-out inventory status and second data of the planned workload over the specified time period, and producing a work plan itinerary as an output from the decisioning module. The work plan itinerary provides sequence instructions or commands for an operator (person and/or robotic mechanism) to follow for changing (Continued)

out of change-out inventory items. Inventory control apparatus configured to carry out the methods are provided, as are other aspects.

28 Claims, 4 Drawing Sheets

(56) References Cited

U.S. PATENT DOCUMENTS

| | | | | |
|---|---|---|---|---|
| 5,653,862 | A * | 8/1997 | Parris | C12Q 1/005 204/403.1 |
| 5,699,259 | A | 12/1997 | Colman et al. | |
| 5,751,580 | A * | 5/1998 | Chi | G05B 19/41865 700/99 |
| 5,890,134 | A * | 3/1999 | Fox | G06Q 10/06313 705/7.22 |
| 5,912,818 | A * | 6/1999 | McGrady | G06M 7/04 700/232 |
| 5,983,198 | A * | 11/1999 | Mowery | G06Q 10/08 705/22 |
| 6,112,502 | A * | 9/2000 | Frederick | G06Q 10/06 53/411 |
| 6,115,640 | A * | 9/2000 | Tarumi | G06Q 10/10 700/99 |
| 6,370,341 | B1 * | 4/2002 | Haines | B41J 3/46 399/24 |
| 6,463,346 | B1 * | 10/2002 | Flockhart | G06Q 10/10 379/266.01 |
| 6,788,997 | B1 * | 9/2004 | Frederick | G06Q 10/087 700/236 |
| 7,029,922 | B2 * | 4/2006 | Miller | G01N 35/025 436/180 |
| 7,467,093 | B1 * | 12/2008 | Newton | G07F 17/0092 705/3 |
| 7,487,182 | B2 * | 2/2009 | Kataria | G16H 10/40 707/999.102 |
| 7,552,071 | B2 * | 6/2009 | Tirinato | G01K 13/00 705/28 |
| 7,685,026 | B1 * | 3/2010 | McGrady | G16H 40/20 705/28 |
| 8,296,170 | B2 * | 10/2012 | O'Brien | G06Q 10/06 705/7.27 |
| 8,306,838 | B2 * | 11/2012 | Heise | G06Q 10/06315 705/7.12 |
| 8,423,180 | B1 * | 4/2013 | Frederick | G07F 9/026 700/236 |
| 8,951,805 | B2 | 2/2015 | Fritchie et al. | |
| 9,261,523 | B2 | 2/2016 | Fritchie et al. | |
| 9,335,336 | B2 | 5/2016 | Silbert et al. | |
| 9,740,897 | B1 * | 8/2017 | Salour | G06K 7/10316 |
| 9,779,588 | B2 * | 10/2017 | Angus | G06Q 10/08 |
| 9,848,774 | B2 * | 12/2017 | Bergstrom | G16H 40/67 |
| 9,864,351 | B2 * | 1/2018 | Slupik | G05B 15/02 |
| 10,024,734 | B2 * | 7/2018 | Tirinato | G06Q 20/203 |
| 10,072,962 | B2 * | 9/2018 | Ismail | A47L 15/0055 |
| 10,082,517 | B2 * | 9/2018 | Ackermann | G01N 35/04 |
| 10,338,086 | B2 * | 7/2019 | Maetzler | G01N 35/00871 |
| 10,817,832 | B1 * | 10/2020 | Agrawal | A61B 5/01 |
| 10,867,274 | B2 * | 12/2020 | Jones | G06Q 50/22 |
| 10,872,307 | B2 * | 12/2020 | Mickles | G06Q 10/087 |
| 11,068,844 | B2 * | 7/2021 | Smith | G06N 7/005 |
| 11,150,256 | B2 * | 10/2021 | Ackermann | G01N 35/00693 |
| 2001/0013247 | A1 * | 8/2001 | Wilson | G01N 33/2888 73/54.01 |
| 2002/0010659 | A1 * | 1/2002 | Cruse | G06Q 10/087 705/28 |
| 2002/0082957 | A1 * | 6/2002 | Krassi | G06Q 10/087 705/29 |
| 2002/0107642 | A1 * | 8/2002 | Nishida | G01N 35/00871 702/23 |
| 2003/0115088 | A1 * | 6/2003 | Thompson | G06Q 10/063112 705/7.14 |
| 2003/0149759 | A1 * | 8/2003 | Hetherington | G06Q 10/06 709/223 |
| 2003/0172009 | A1 * | 9/2003 | Katou | G06Q 20/203 705/28 |
| 2004/0181528 | A1 * | 9/2004 | Tirinato | G06Q 20/203 |
| 2004/0220844 | A1 * | 11/2004 | Sanville | G06Q 10/06316 705/7.26 |
| 2005/0014285 | A1 | 1/2005 | Miller | |
| 2005/0049942 | A1 * | 3/2005 | Richard | G06Q 10/087 705/28 |
| 2005/0242181 | A1 * | 11/2005 | Cunningham | G06Q 10/087 235/385 |
| 2006/0030049 | A1 * | 2/2006 | Bhimani | G01K 3/005 436/43 |
| 2006/0178568 | A1 * | 8/2006 | Danna | B01L 3/502715 600/300 |
| 2006/0247985 | A1 * | 11/2006 | Liamos | G16H 20/10 705/28 |
| 2007/0192715 | A1 * | 8/2007 | Kataria | G06Q 10/087 705/28 |
| 2008/0025734 | A1 * | 1/2008 | Kehoe | G03G 15/55 399/8 |
| 2008/0065264 | A1 * | 3/2008 | Omura | G06Q 10/087 700/231 |
| 2008/0167976 | A1 * | 7/2008 | Chuang | G06Q 10/087 705/28 |
| 2008/0240988 | A1 * | 10/2008 | Wakamiya | G01N 35/00693 422/68.1 |
| 2009/0119142 | A1 * | 5/2009 | Yenni | H04L 67/12 705/7.15 |
| 2009/0281930 | A1 * | 11/2009 | Sakagami | G01N 35/00663 705/28 |
| 2009/0326829 | A1 * | 12/2009 | Liamos | G07F 7/00 702/19 |
| 2010/0042439 | A1 * | 2/2010 | Martinez | G16H 40/20 705/3 |
| 2010/0082483 | A1 * | 4/2010 | Sanders | G06Q 20/18 705/42 |
| 2010/0204557 | A1 * | 8/2010 | Kiaie | A61B 5/411 600/365 |
| 2010/0322822 | A1 * | 12/2010 | Fritchie | G01N 35/1009 422/63 |
| 2010/0324722 | A1 | 12/2010 | Fritchie et al. | |
| 2011/0071869 | A1 * | 3/2011 | O'Brien | G06Q 10/103 705/7.12 |
| 2011/0245089 | A1 * | 10/2011 | Scott | G16H 10/40 506/7 |
| 2011/0246215 | A1 * | 10/2011 | Postma | G06Q 10/087 705/2 |
| 2012/0232520 | A1 * | 9/2012 | Sloan | G16Z 99/00 604/504 |
| 2012/0296769 | A1 * | 11/2012 | Ginster, II | G06Q 10/087 705/26.8 |
| 2014/0048556 | A1 * | 2/2014 | Pearcy | B01L 3/52 222/137 |
| 2014/0337040 | A1 * | 11/2014 | Debusk | G06Q 50/00 705/2 |
| 2015/0186834 | A1 * | 7/2015 | Mickles | G06Q 10/087 705/28 |
| 2016/0299164 | A1 * | 10/2016 | Ackermann | G01N 35/00693 |
| 2018/0082038 | A1 * | 3/2018 | Blair, II | G06Q 10/087 |
| 2019/0178680 | A1 * | 6/2019 | Kriss | G06Q 50/28 |
| 2019/0206007 | A1 * | 7/2019 | Leach | G06Q 50/28 |
| 2020/0013501 | A1 * | 1/2020 | Page | G16H 40/40 |
| 2020/0057998 | A1 * | 2/2020 | Ophardt | G06Q 10/063116 |
| 2020/0271683 | A1 * | 8/2020 | Ha | G01N 35/00732 |
| 2020/0334614 | A1 * | 10/2020 | Javaid | G06Q 10/063116 |

\* cited by examiner

PREDICTIVE INVENTORY CONTROL INCLUDING SCHEDULING AND PERFORMING BIO-FLUID TESTS OUT OF ORDER BASED ON REAGENT INVENTORY EXPIRATION

FIELD

The present disclosure relates to methods and apparatus adapted to predict inventory in automated testing systems.

BACKGROUND

In medical testing and processing, automated analyzer apparatus such as in vitro diagnostic instruments may include the use of robotics and are used to test concentrations of certain constituents contained in biological specimens (referred to herein as "bio-fluid specimens"). Such automated analyzer apparatus are complex and can run hundreds or even thousands of diagnostic tests each day. At some facilities, there may be a large number of such automated analyzer apparatus at one location, such as in one laboratory. Typically a laboratory will receive the orders from a Laboratory Information System (LIS) or the like and specimen containers containing specimens in bulk at the start of the work day or shift. The laboratory will endeavor to produce all of the test results by the end of that shift or work day. Each of these diagnostic tests can consume reagent (e.g., in reagent packs) and other inventory items (such as diluent (e.g., water), cleaning fluid, cuvettes, plates (e.g., micro-well plates), magnetic beads, probe tips, and the like) that are used on the automated analyzer apparatus as part of carrying out the diagnostic tests. Keeping the inventory on these systems replenished and ensuring that their use is maximized (i.e., ensuring that perishable items do not expire) is a substantial challenge, while at the same time attempting to maximize instrument usage (i.e., minimize analyzer downtime).

Accordingly, methods and apparatus that can improve inventory control in such in automated analyzer apparatus are sought.

SUMMARY

In one method embodiment, an inventory control method is provided. The inventory control method includes receiving change-out inventory status from each of one or more automated analyzer apparatus at a server, receiving an estimate of the planned workload over a specific time period at the server, analyzing with a decisioning module of the server, first data of the change-out inventory status and second data of the estimate of the planned workload over the specific time period, and producing a work plan itinerary as an output from the decisioning module, wherein the work plan itinerary provides work sequence instructions for an operator (person or robotic mechanism) to follow.

In an apparatus embodiment, an inventory control apparatus is provided. The inventory control apparatus includes one or more automated analyzer apparatus configured to perform one or more tests on bio-fluid specimens, wherein each of the one or more automated analyzer apparatus includes a change-out inventory, and a server in electronic communication with the one or more automated analyzer apparatus, the server including: a communication interface configured to receive: change-out inventory status from each of the one or more automated analyzer apparatus, and a daily workload input providing an estimate of test demand over a specific time period, a database configured to contain first data on the change-out inventory status for each of the automated analyzer apparatus and second data on the estimate of test demand over the specific time period, and a decisioning module configured and operable to analyze the first data on the change-out inventory status and the second data on the estimate of the test demand over the specific time period and provide a work plan itinerary including work sequence instructions for an operator to follow.

In another embodiment, an inventory control apparatus is provided. The inventory control apparatus includes a plurality of automated analyzer apparatus configured to perform tests on bio-fluid specimens, wherein each of the automated analyzer apparatus includes a change-out inventory comprising at least a plurality of reagents, and a server in electronic communication with each of the plurality of automated analyzer apparatus, the server including: a communication interface configured to receive: change-out inventory status from each of the plurality of automated analyzer apparatus, and an estimate of planned workload over a specific time period derived from a laboratory information system; a database configured to contain first data on the change-out inventory status for each of the automated analyzer apparatus and second data on the estimate of planned workload over the specified time period; and a decisioning module configured and operable to analyze the first data on the change-out inventory status and the second data on the planned workload over the specific time period and provide a work plan itinerary of sequence instructions for an operator to follow, wherein the work plan itinerary includes one or more of:

a) when to replenish certain unique change-out inventory items on one or more of the plurality of automated analyzer apparatus, b) performing tests out of order when one or more of the plurality of reagents are expiring, c) instructions to replenish refrigerated inventory items, d) instructions to calibrate one or more of the plurality of automated analyzer apparatus, e) instructions to perform a quality control on one or more of the plurality of automated analyzer apparatus, and f) instructions to empty waste material from one or more of the plurality of automated analyzer apparatus.

Still other aspects, features, and advantages of the present disclosure may be readily apparent from the following detailed description illustrating a number of example embodiments. The present invention may also be capable of different embodiments, and its several details may be modified in various respects, all without departing from the scope of the present disclosure. Accordingly, the disclosure is to cover all modifications, equivalents, and alternatives falling within the scope of the disclosure as defined by the claims.

DETAILED DESCRIPTION

Operators of such automated test apparatus in the lab may comprise test apparatus operators having a mixture of skill levels, wherein some operators can be new and relatively inexperienced operators, some can be more seasoned operators, and some can be simply superior at managing the large amount of inputs and outputs from the automated test apparatus in the lab. However, the inability of a relatively inexperienced lab operator to anticipate operational and inventory needs of the multiple analyzers under their control can result in analyzer downtime as well as spoilage/expiration of certain inventory items (i.e., expiration of the inventory item before they can be used, such as a refrigerated reagent). When managing multiple analyzers, the organizational tasks are compounded as a function of the number of analyzers under the control of an operator. Even a skilled operator can fail to properly manage all the tasks required when managing a very large number of analyzers. However, an inexperienced operator may be unable to effective manage even a small number of analyzers, without substantial downtime and loss of viable inventory.

Thus, inventory control apparatus and methods that can turn even an inexperienced operator into a superior operator would represent a major advancement in the art. Moreover, inventory control apparatus and methods that can allow a mediocre or superior operator to manage even more analyzers can help lower cost per test and improve inventory utilization rates.

In view of the problems of the prior art, in one or more embodiments, an inventory control method is provided. The inventory control method includes receiving change-out inventory status from each of one or more automated analyzer apparatus at a server, receiving an estimate of the planned workload over a specific time period (e.g., over a shift or a day) at the server, analyzing with a decisioning module of the server, first data of the change-out inventory status and second data of the estimate of the planned workload over the specific time period, and producing a work plan itinerary as an output from the decisioning module. The work plan itinerary provides work sequence instructions for the operator to follow.

In another aspect, an inventory control apparatus is provided. The inventory control apparatus includes one or more automated analyzer apparatus configured to perform one or more tests on bio-fluid specimens, wherein each of the one or more automated analyzer apparatus includes a change-out inventory and a server in electronic communication with the one or more automated analyzer apparatus. The server includes: a communication interface configured to receive change-out inventory status from each of the one or more automated analyzer apparatus and a daily workload input providing an estimate of test demand over a specific time period, a database configured to contain first data on the change-out inventory status for each of the automated analyzer apparatus and second data on the estimate of test demand over the specific time period, and a decisioning module configured and operable to analyze the first data on the change-out inventory status and the second data on the estimate of the test demand over the specific time period and provide a work plan itinerary. The work plan itinerary includes work sequence instructions for the operator to follow.

Such inventory control apparatus and methods may provide one or more benefits and/or advantages, such as: 1) reduced instrument down-time by effectively managing and/or consolidating tasks for the one or more analyzers; 2) improving operator and testing efficiency; 3) improving operator organization; 4) reduced mean time to conduct tasks associated with change-out of change-out items 5) lowering per test; and 6) and even lowering downtime of the automated test apparatus.

In view of the foregoing, one or more embodiments of the disclosure provides inventory control methods and inventory control apparatus configured and operable to generate a work plan itinerary including sequence instructions for change-out of change-out items that can be followed by an operator of an automated analyzer apparatus.

These and other aspects and features of embodiments of the disclosure will be described with reference to FIGS. 1-4 herein.

Figure 1:
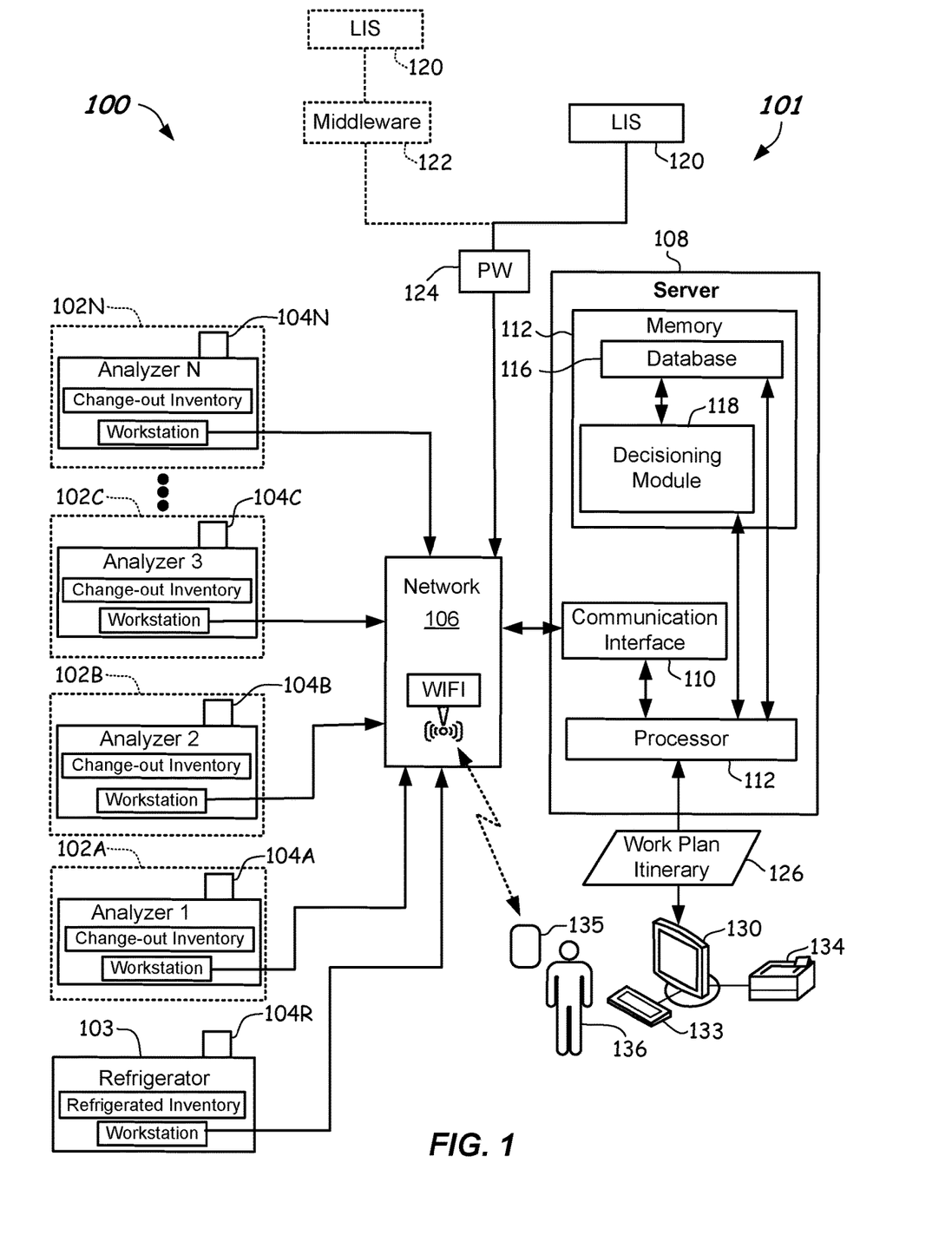
FIG. 1 illustrates a schematic diagram of an inventory control apparatus according to one or more embodiments.
Figure 2:
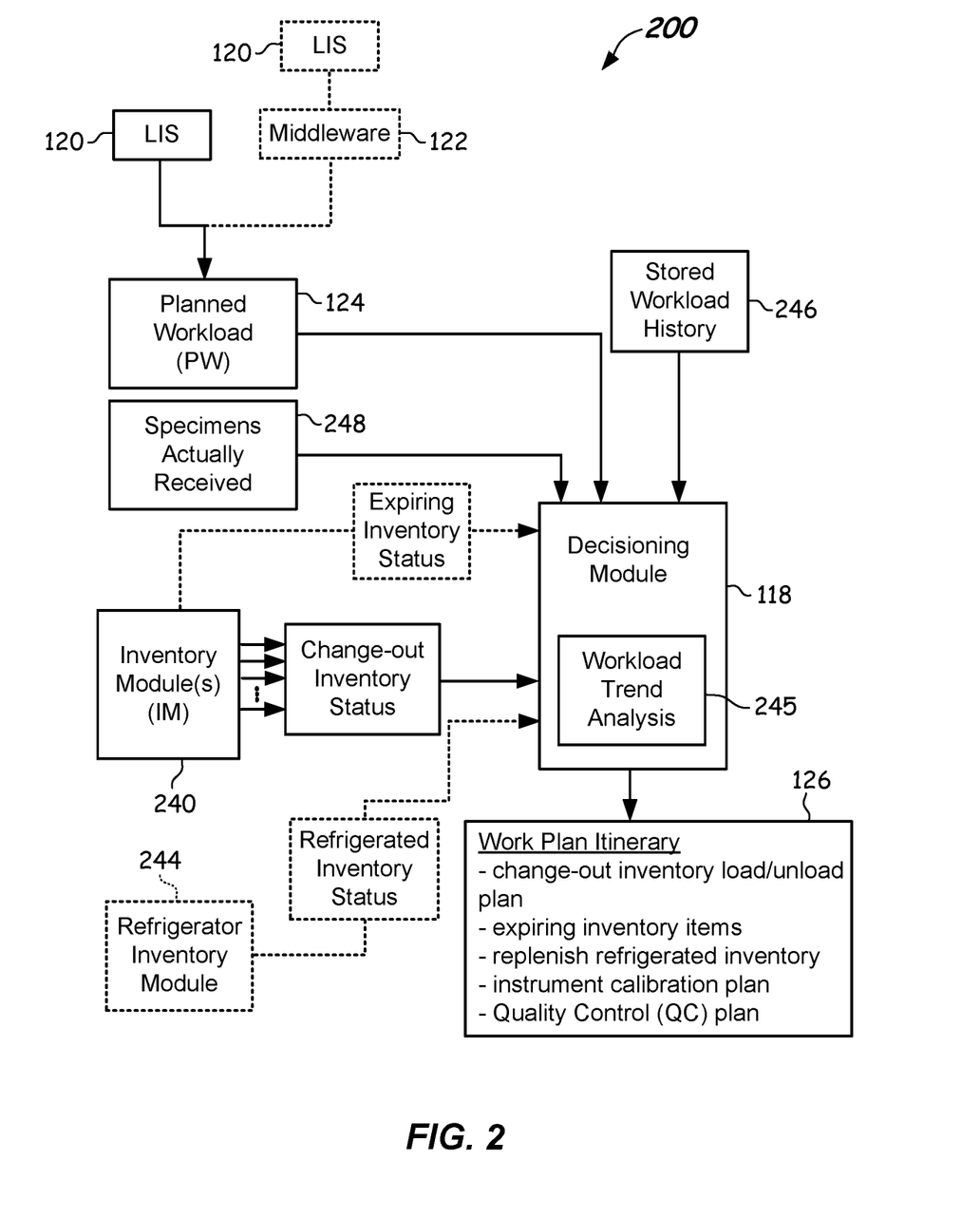
FIG. 2 illustrates a schematic functional diagram of a testing apparatus including inventory control according to one or more embodiments.

In accordance with one or more embodiments, referring now to FIGS. 1 and 2, an automated analyzer apparatus 100 including an inventory control apparatus 101 is shown and described. The automated analyzer apparatus 100 includes one or more automated analyzer apparatus 102A-102N. The one or more automated analyzer apparatus 102A-102N may comprise one or more testing and/or processing apparatus configured and adapted to conduct tests on bio-fluids, such as clinical chemistry testing apparatus, immunoassay testing apparatus, and the like (hereinafter referred to as analyzer or analyzers).

The automated analyzer apparatus 100 may include a server 108 (e.g., a data server) communicatively coupled to the one or more automated analyzer apparatus 102A-102N. For example, the coupling may be by way of a network 106, such as a suitable wired or wireless network. Any suitable network allowing electronic communication with the one or more automated analyzer apparatus 102A-102N can be used. Each of the automated analyzer apparatus 102A-102N may include a workstation including a communication circuit (e.g., an electronic communication card such as an Ethernet adapter or the like) that is operable to enable electronic communication with the network 106. Network 106 may be a local area network (LAN), wireless local area network (WLAN), power line communication (PLC) network, or the like. Other suitable networks facilitating electronic communication may be used. In some embodiments, the one or more automated analyzer apparatus 102A-102N may be in a same lab as the server 108.

In accordance with another aspect, some of the automated analyzer apparatus 102A-102N may include one or more sensors 104A-104N, that may provide information concerning the status of various change-out inventory items used on or by each of the automated analyzer apparatus 102A-102C. Such status information may be provided to the workstation thereof. The workstation can be a computer resident with, and a part of, the respective analyzer 102A-102N that controls the functions thereof. For example, the sensors 104A-104N may include level sensors configured to sense level of a change-out item (e.g., diluent, water, cleaning solution, waste liquid, a scale), counters (e.g., barcode readers) enabling obtaining a count of certain inventory items such as reagent packs, presence sensors enabling the sensing of the presence of an inventory item, and the like. Any suitable sensor may be used for providing data on the status one or more change-out items. However, in some embodiments, some status data may be manually entered into one or more of the workstations.

The server 108 may be any suitable computer device including a processor 112 (e.g., CPU or microprocessor), memory 112 (e.g., RAM, ROM, or other), and communication interface 110, and other peripherals. Communication interface 110 may include any suitable device or devices enabling communication with the network 106 such as Ethernet adapter or the like.

Data received from the one or more automated analyzer apparatus 102A-102N on change-out inventory status may be transmitted by the network 106 and stored in memory 112 in a database 116. Data may be periodically pushed via sending data packets from the one or more automated analyzer apparatus 102A-102N as commanded by the workstations, or may be periodically pulled by request of the server 108 followed by sending data packets from the one or more automated analyzer apparatus 102A-102N through the network 106. Inventory change-out status data may include time stamps, analyzer identification data, inventory item identification, as well as absolute values (e.g., counts, levels, or other quantity indicators). Database 116 may be configured to contain, and actually contain a running compilation of the inventory change-out status data for each of the one or more automated analyzer apparatus 102A-102N. The periodic push or pull of the data may take place at any suitable interval or period, such as every half hour, hour, several hours, half shift, per shift, per day, and the like. Other suitable push/pull periods or intervals may be used. Thus, it should be apparent that the server 108 receives the change-out inventory status from each of one or more automated analyzer apparatus 102A-102N periodically and maintains an up to date database 116 containing the change-out items status at suitable times.

Additionally, the server 108 is configured to, and receives an estimate of the planned workload 124 over a specific time period, which is also stored in memory 112 in the database 116. The specific time period may be a half shift, a shift (8 hours), a day, or other suitably-long time period. The planned workload (PW) 124 can be a listing of all the tests that are to be conducted on an analyzer 102A-102N during that specific time period. In one system configuration, the planned workload 124 may be received via electronic communication with the laboratory information system LIS 120. The LIS 120 is in communication with the network 106 in the depicted embodiment. LIS 120 can be operating on an entirely different network. Optionally, LIS 120 may be part of the network 106. In an optional configuration, the planned workload 124 may be received from middleware 122, which is software that can take into account other functional items. In an optional configuration, the planned workload 124 may be received from middleware 122, which is software that can take into account and carry out other functional tasks. The other functional tasks may include result auto-verification, quality control result review, panic value handling, result review & edit, and support for other clinical result workflows. The planned workload 124 can be received from the network 106 at the communication interface 110 of the server 108.

Once the planned workload (PW) and the updates on the change-out status of change-out items and inventories from each of the automated analyzer apparatus 102A-102N are received by the server 108, a decisioning module 118 of the server 108 can analyze the received and stored data. The decisioning module 118 is embodied as a software routine in some embodiments and takes the first data of the change-out inventory status for each of the automated analyzer apparatus 102A-102N and second data of the estimate of the planned workload 124 over the specific time period (e.g., over a shift or a day), and produces a work plan itinerary 126 as an output from the decisioning module 118, wherein the work plan itinerary 126 provides work sequence instructions for an operator 136 to follow.

In one embodiment, the work plan itinerary 126 can be displayed as an instruction or communication (as a graphic, writing, visual, or the like) on a display device that is accessible by the operator 136. The operator 136 can be a person or in some instances may be a robot or controllable mechanism configured to receive and carry out one or more electronic command instructions or communications concerning one or more components of the work plan itinerary 126. In other embodiments, the instructions can be audible instructions for the operator 136 to follow. The work plan itinerary 126 includes work sequence instructions or communications for the operator 136 to follow, that may include specific instructions or communications concerning replenishment of change-out (e.g., inventory and other items) on the one or more automated analyzer apparatus 102A-102N. The work plan itinerary 126 of the work sequence instructions can comprise a listing of activities and associated times for accomplishing the activities for the operator 136 of the one or more automated analyzer apparatus 102A-102N or any subset thereof to follow.

The work sequence and associated data can include the item type, lot number, number of tests per each item, the analyzer identifier, instrument position of the change-out item, location of the stored stock of change-out item, if applicable, and/or time for change-out. Thus, the work sequence instructions or communications provide all the operator 136 needs to follow in order to streamline change-out of an inventory item. Once the inventory items are changed out, the database 116 can be updated.

In some embodiments, the output of the work plan itinerary 126 is to a printer 134 accessible by the operator 136 so that a hard copy of the work sequence instructions can be taken along with the operator 136 as the operator carries out the detailed change-out tasks. The work sequence instructions can identify the specific automated analyzer apparatus 102A-102N that needs a change-out of a change-out item, and the time for carrying out the specific task. In other embodiments, the output of the work plan itinerary 126 may be to a hand-held device 135 that is accessible by the operator 136 and can thus be carried with the operator 136 as the tasks are carried out. In other embodiments, the output of the work plan itinerary 126 may be to a suitable monitor 130 or the like. Other forms of communication of the work sequence instructions such as audible or electronic commands (e.g., when the operator 136 is a robot or robotic mechanism) can be used.

In some embodiments, the analyzing taking place by the software routine within the decisioning module 118 comprises summing some of unique change-out items for each of the one or more automated analyzer apparatus 102A-102N and comparing the sums to the planned workload 124 over the specific time period utilizing the unique change-out inventory items and then determining specific times for replenishing the unique consumable inventory items on each of the one or more automated analyzer apparatus 102A-102N.

In some embodiments, the decisioning module 118 can produce as an output a work plan itinerary 126 that is updated based upon changes in the planned workload 124 over the specific time period received by the server 108. Such updated work plan itinerary 126 can be provided periodically, such as hourly, at the beginning of a new shift, or part way through a shift. Thus, the operator 136 can have updated work sequence instructions at suitable time periods throughout the shift or day.

In some embodiments, the analyzing by the decisioning module 118 can include reviewing expiring inventory status data received from the inventory module (IM) 240 over the specific time period and deciding on a suitable work plan itinerary 126 wherein tests may be conducted out of sequence with their ordinary order to ensure maximum usage of the oldest reagent inventory items before they expire. The software routine of the decisioning module 118 can further comprise analyzing the specimens actually received at the one or more automated analyzer apparatus 102A-102N against the tests ordered over the specified period to arrive at the work plan itinerary.

In another embodiment, the analyzing of the planned workload 124 over the specific time period by the decisioning module 118 can further comprise analyzing a stored workload history 246 in order to develop a workload trend wherein the work plan itinerary 126 includes adjustments based on the workload trend. For example, a workload trend analysis 245, which may be a suitable subroutine, can analyze past data stored in the database 116 or otherwise provided for certain days, dates, holidays, or other occurrences (e.g., emergencies, disease outbreaks, and the like) and then adjust the work plan itinerary 126 based thereon.

Furthermore, the decisioning module 118 may access refrigerated inventory status forwarded from a refrigerator inventory module 244 (e.g., a software subroutine including refrigerated inventory counts of the different types of reagents and other refrigerated inventory, physical location within the refrigerator, lot data, and/or and expiration data) and received by the database 116 from a sensor 104R (e.g., a barcode reader or the like) associated with a refrigerator 103 containing refrigerated reagents and/or other refrigerated inventory items. As such, the work plan itinerary 126 can include specific physical location information within the refrigerator 103 when the task comprises a change-out of a particular refrigerated reagent inventory item on one or more of the automated analyzer apparatus 102A-102N.

Thus, the decisioning module 118 may produce a work plan itinerary 126 that provides a change-out item load/unload plan, wherein the work plan itinerary 126 may take into account expiring inventory items, loading of change-out inventory items, may involve tasks of replenishing certain refrigerated inventory items, or even time-associated instructions to conduct calibration and/or quality control of one or more of the one or more automated analyzer apparatus 102A-102N. In more detail, the work plan itinerary 126 can include one or more of:

a) when to replenish certain unique items of the change-out inventory on one or more of the one or more automated analyzer apparatus 102A-102N (e.g., probe tips, cuvettes, films, process liquids, micro-well plates, magnetic beads, reagent packs, and the like), b) performing tests out of order when a reagent inventory item is expiring, c) instructions to replenish refrigerated inventory items in the refrigerator 103, so as, for example, to meet the needs of the tests in queue for the specific time period, d) instructions to perform a calibration of one or more of the one or more automated analyzer apparatus 102A-102N, e) instructions to perform quality control (QC) test on one or more of the one or more automated analyzer apparatus 102A-102N, and f) instructions to empty a change-out inventory item such as waste material (waste tips, cuvettes, wash liquid) from one or more of the one or more automated analyzer apparatus 102A-102N. Additional change-out items may be including on the In some embodiments, the work plan itinerary 126 can comprise one or more graphical outputs (e.g., displayed on a monitor 130 or hand-held device 135) comparing summations of unique change-out inventory on-board each of the one or more automated analyzer apparatus 102A-102N against expected demand for each of the one or more automated analyzer apparatus 102A-102N over the specific time period. Thus, any shortfall can be graphically seen and graphically depicted to the operator 136.

The unique change-out inventory items can comprise one or more of: the plurality of reagents, a process liquid, a reaction vessel, disposable test ware, and/or process waste. The reaction vessels can comprise cuvettes, aliquot plates, micro-well plates, or sample cups, for example. The process liquids can comprise one or more of salt bridge solutions, conditioning solutions, pretreatment solutions, buffers, calibrator liquids, control liquids, cleaning liquids, diluents, and the like. The disposable test ware can comprise one or more of probe tips, tubes, cuvette film, diaphragms, barcode labels, printer paper, and the like. The waste material can comprise one or more of: used cleaning liquids, used probe tips, used cuvettes, other used items as a result of testing, and the like.

Figure 3:
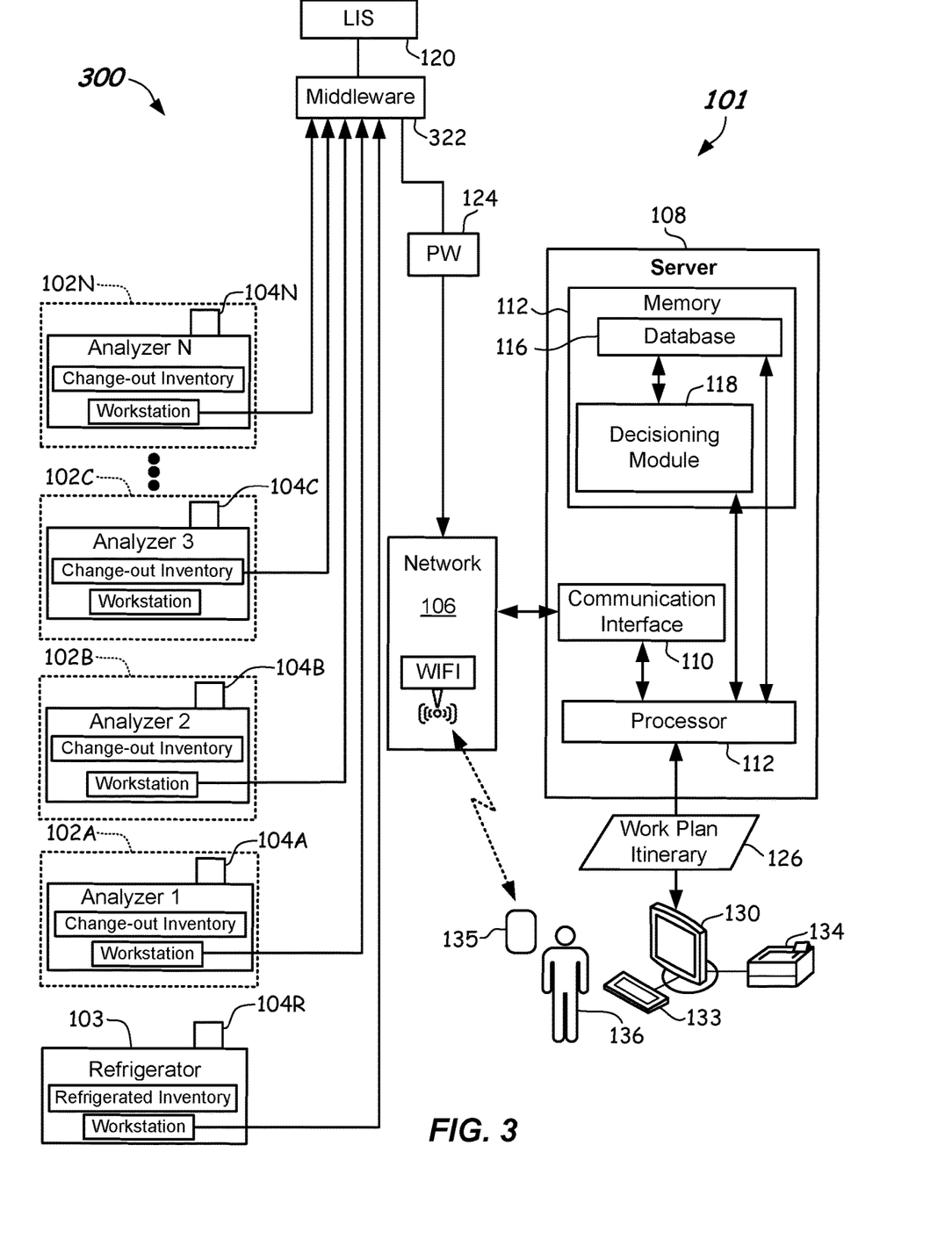
FIG. 3 illustrates a schematic diagram of an alternative testing apparatus including inventory control according to embodiments.

FIG. 3 illustrates an optional configuration of an automated analyzer apparatus 300 including an inventory control apparatus 101 wherein the change-out inventory status for each of the automated analyzer apparatus 102A-102N is provided to the middleware 322, which, in turn, provides the change-out inventory status to the server 108. Thus, the change-out inventory status from each of one or more automated analyzer apparatus (102A-102N) is received through an intermediary (the middleware 322). Other configurations are possible.

Figure 4:
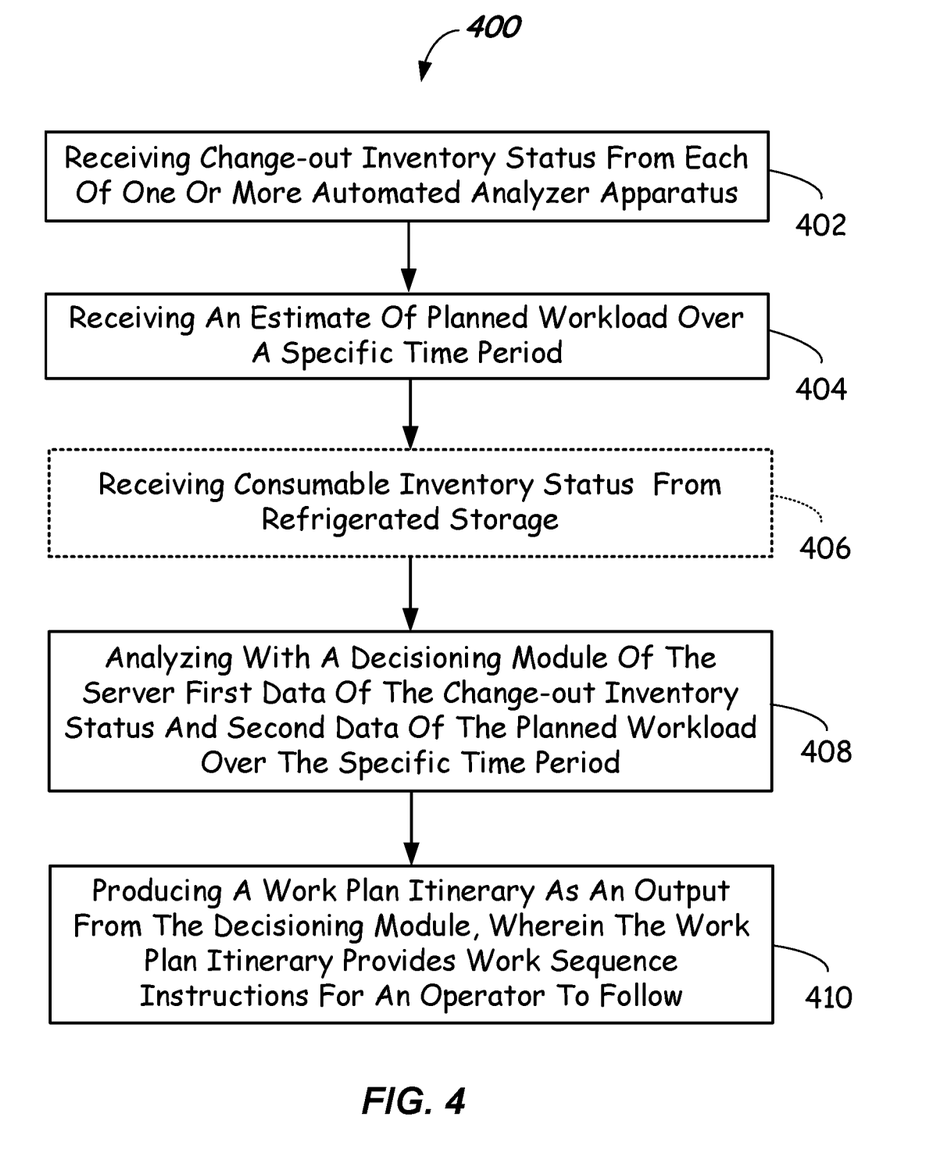
FIG. 4 illustrates a flowchart of an inventory control method according embodiments.

Referring to FIG. 4, a description of an example inventory control method 400 is provided. The inventory control method 400 includes, in 402, receiving change-out inventory status from each of one or more automated analyzer apparatus (e.g., automated analyzer apparatus 102A-102N) at a server (e.g., server 108).

The method 400 further includes, in 404, receiving an estimate of the planned workload (e.g., PW 124) over a specific time period (e.g., shift, day, or the like) at the server. The method 400 can optionally include receiving consumable inventory status from refrigerated storage (e.g., refrigerator 103). The planned workload (e.g., PW 124) can come from any suitable source, such as the LIS 120 or middleware (e.g., middleware 122, 332).

The method 400, then includes, in 408, analyzing with a decisioning module (e.g., decisioning module 118) of the server, first data of the change-out inventory status and second data of the estimate of the planned workload over the specific time period. Finally, the method 400 comprises, in 410, producing a work plan itinerary (e.g., work plan itinerary 126) as an output from the decisioning module, wherein the work plan itinerary provides work sequence instructions for an operator (e.g., operator 136) to follow. Thus, the operator 136 is given succinct, easy-to-follow instructions that maximize productivity, minimize shortages of change-out inventory items, and other instructions that are based on anticipated test demand over the specific time period.

While specific apparatus and methods have been shown by way of example embodiments herein, it should be understood that other and different embodiments are possible. It is intended that the disclosure is to cover all modifications, equivalents, and alternatives falling within the scope of the claims.

What is claimed is:

1. An inventory control method, comprising:
receiving change-out inventory status from each of one or more automated analyzer apparatus at a server, the change-out inventory status including expiring inventory status;
receiving an estimate of a planned workload over a specific time period at the server;
analyzing with a decisioning module of the server, first data of the change-out inventory status and second data of the estimate of the planned workload over the specific time period;
producing a work plan itinerary as an output from the decisioning module, wherein the work plan itinerary provides work sequence instructions that include electronic command instructions to a robot or controllable mechanism for performing tests out of order before a reagent inventory item expires;
receiving the electronic command instructions produced by the decisioning module at the robot or controllable mechanism; and
performing the tests out of order by the robot or controllable mechanism before a reagent inventory item expires.

2. The method of claim 1, comprising communicating the work plan itinerary to an operator, wherein the work sequence instructions concern replenishment of change-out inventories of the one or more automated analyzer apparatus.

3. The method of claim 1, comprising displaying the work plan itinerary on a display device, wherein the work sequence instructions concern replenishment of change-out inventories of the one or more automated analyzer apparatus.

4. The method of claim 1, comprising providing an output of the work plan itinerary to a printer.

5. The method of claim 1, comprising providing an output of the work plan itinerary to a hand-held device.

6. The method of claim 1, wherein the work plan itinerary of the work sequence instructions comprises a listing of activities and associated times for accomplishing the activities.

7. The method of claim 1, wherein the work plan itinerary of the work sequence instructions comprises a communicated instruction to carry out a change-out activity on the one or more automated analyzer apparatus.

8. The method of claim 1, wherein at least some of the work sequence instructions are performed by a robotic mechanism to replenish refrigerated inventory items.

9. The method of claim 1, wherein the estimate of the planned workload over a specific time period is received from a laboratory information system.

10. The method of claim 1, wherein the estimate of the planned workload over a specific time period is received from middleware.

11. The method of claim 1, wherein the analyzing with a decisioning module comprises summing some of unique change-out inventory items for each of the one or more automated analyzer apparatus and comparing to the planned workload over the specific time period utilizing the unique change-out inventory items and determining specific times for replenishing the unique change-out inventory items on each of the one or more automated analyzer apparatus.

12. The method of claim 1, wherein the receiving change-out inventory status by the server comprises a periodic push operation by the one or more automated analyzer apparatus.

13. The method of claim 1, wherein the receiving change-out inventory status by the server comprises a periodic pull operation by the server.

14. The method of claim 1, comprising producing an updated work plan itinerary as an output from the decisioning module based upon changes in the planned workload over the specific time period received by the server.

15. The method of claim 14, wherein the updated work plan itinerary is provided periodically.

16. The method of claim 14, wherein the updated work plan itinerary is provided hourly, at a beginning of a new shift, or part way through a shift.

17. The method of claim 1, wherein the specific time period is hourly, daily, at a beginning of a shift, or part way through the shift.

18. The method of claim 1, wherein the analyzing over the specific time period further comprises analyzing a stored workload history to develop a workload trend wherein the work plan itinerary includes adjustments based on the workload trend.

19. The method of claim 1, wherein the analyzing over the specific time period further comprises analyzing specimens actually received against the tests ordered over the specified period to arrive at the work plan itinerary.

20. The method of claim 1, wherein the work plan itinerary includes one or more of:
a) when to replenish certain unique items of the change-out inventory on one or more of the one or more automated analyzer apparatus,
b) instructions to replenish refrigerated inventory items,
c) instructions to calibrate one or more of the one or more automated analyzer apparatus,
d) instructions to perform a quality control on one or more of the one or more automated analyzer apparatus, and
e) instructions to empty waste material from one or more of the one or more automated analyzer apparatus.

21. The method of claim 1, wherein the work plan itinerary comprises one or more graphical outputs comparing summations of unique change-out inventory on-board each of the one or more automated analyzer apparatus against expected demand for each of the one or more automated analyzer apparatus over the specific time period.

22. An inventory control apparatus, comprising:
one or more automated analyzer apparatus configured to perform one or more tests on bio-fluid specimens, wherein each of the one or more automated analyzer apparatus includes a change-out inventory;
a server in electronic communication with the one or more automated analyzer apparatus, the server including:
a communication interface configured to receive:
change-out inventory status from each of the one or more automated analyzer apparatus, the change-out inventory status including expiring inventory status, and
a daily workload input providing an estimate of test demand over a specific time period;
a database configured to contain first data on the change-out inventory status for each of the automated analyzer apparatus and second data on the estimate of test demand over the specific time period; and
a decisioning module configured and operable to analyze the first data on the change-out inventory status and the second data on the estimate of the test demand over the specific time period and provide a work plan itinerary including work sequence instructions that include electronic command instructions for performing tests out of order before one or more reagents expire; and a robot or controllable mechanism in electronic communication with the server to receive the electronic command instructions to perform tests out of order before one or more reagents expire, the robot or controllable mechanism performing tests out of order in response to receiving the electronic command instructions.

23. An inventory control apparatus, comprising:

a plurality of automated analyzer apparatus configured to perform tests on bio-fluid specimens, wherein each of the automated analyzer apparatus includes a change-out inventory comprising at least a plurality of reagents;

a server in electronic communication with each of the plurality of automated analyzer apparatus, the server including:

a communication interface configured to receive:
change-out inventory status from each of the plurality of automated analyzer apparatus, the change-out inventory status including expiring inventory status, and an estimate of planned workload over a specific time period derived from a laboratory information system;

a database configured to contain first data on the change-out inventory status for each of the automated analyzer apparatus and second data on the estimate of planned workload over the specified time period; and a decisioning module configured and operable to analyze the first data on the change-out inventory status and the second data on the planned workload over the specific time period and provide a work plan itinerary of sequence instructions, wherein the work plan itinerary includes electronic command instructions for performing tests out of order before one or more of the plurality of reagents expire and one or more of:

a) when to replenish certain unique change-out inventory items on one or more of the plurality of automated analyzer apparatus, b) instructions to replenish refrigerated inventory items, c) instructions to calibrate one or more of the plurality of automated analyzer apparatus, d) instructions to perform a quality control on one or more of the plurality of automated analyzer apparatus, and e) instructions to empty waste material from one or more of the plurality of automated analyzer apparatus; and a robot or controllable mechanism in electronic communication with the server to receive the electronic command instructions to perform tests out of order before one or more reagents expire, the robot or controllable mechanism performing tests out of order in response to receiving the electronic command instructions.

24. The inventory control apparatus of claim 23, wherein the unique change-out inventory items comprise one or more of: the plurality of reagents, a process liquid, a reaction vessel, disposable test ware, and process waste.

25. The inventory control apparatus of claim 24, wherein the reaction vessel comprises cuvettes, aliquot plates, or sample cups.

26. The inventory control apparatus of claim 24, wherein the process liquids comprise one or more of salt bridge solutions, conditioning solutions, pretreatment solutions, buffers, calibrator liquids, control liquids, cleaning liquids, and diluents.

27. The inventory control apparatus of claim 24, wherein the disposable test ware comprises one or more of probe tips, tubes, cuvette film, diaphragms, barcode labels, and printer paper.

28. The inventory control apparatus of claim 23, wherein the waste material comprises one or more of used cleaning liquid, used probe tips, and used cuvettes.

* * * * *